(12) United States Patent
Okeya et al.

(10) Patent No.: US 7,512,231 B2
(45) Date of Patent: Mar. 31, 2009

(54) COMPUTATION METHOD FOR MODULAR EXPONENTIATION OPERATION IN DECRYPTION OR SIGNATURE GENERATION

(75) Inventors: Katsuyuki Okeya, Yokohama (JP); Tsuyoshi Takagi, Hofheim-Wallau (DE)

(73) Assignee: Hitachi, Ltd., Tokyo (JP)

( * ) Notice: Subject to any disclaimer, the term of this patent is extended or adjusted under 35 U.S.C. 154(b) by 757 days.

(21) Appl. No.: 10/893,523

(22) Filed: Jul. 19, 2004

(65) Prior Publication Data

US 2005/0147241 A1 Jul. 7, 2005

(30) Foreign Application Priority Data

Jan. 7, 2004 (JP) ............................. 2004-001602

(51) Int. Cl.
*H04L 9/28* (2006.01)
(52) U.S. Cl. ...................................................... 380/28
(58) Field of Classification Search .................. 380/28, 380/46, 277–285
See application file for complete search history.

(56) References Cited

U.S. PATENT DOCUMENTS

| 6,011,848 | A  | * | 1/2000  | Kanda et al. ................ 713/170 |
| 6,304,658 | B1 | * | 10/2001 | Kocher et al. ................ 380/30 |
| 6,411,715 | B1 | * | 6/2002  | Liskov et al. ............... 380/277 |
| 7,065,788 | B2 | * | 6/2006  | Yajima et al. ................ 726/23 |
| 7,248,700 | B2 | * | 7/2007  | Seifert et al. ................ 380/282 |
| 2004/0125950 | A1 | * | 7/2004 | Yen et al. ...................... 380/30 |
| 2006/0050868 | A1 | * | 3/2006 | Bockes et al. ................. 380/28 |

OTHER PUBLICATIONS

Applied Cryptography, Second Edition: protocols algorithms, and source code in C Bruce Schneier ISBN 0-471-12845-7 Copyright 1996 pp. 419, 468, and 489-491.*
P.C. Kocher, et al., "Differential Power Analysis" in the proceedings of CRYPTO 1999, Lectrue Notes In Computer Science1686, Springer-Verlag, pp. 388-397, 1999.
R. Novak, "SPA-Based Adaptive Chosen-Ciphertext Attack on RSA Implementation" In the proceeding of 2002 International Workshop on Practice and Theory in Public Key Cryptography (PKC2002), Lecture Notes In Computer Science 2274, Springer-Verlag, pp. 252-262, 2002.
P.C. Kocher, "Timing Attacks on Implementations of Diffie-Hellman, RSA, DSS, and Other Systems" in the proceedings of CRYPTO 1996, Lecture Notes in Computer Science 1109, Springer-Verlag, pp. 104-113, 1996.
Public-Key Cryptography Standards, PKCS # 1, Amendment 1: Multi-prime RSA, RSA Laboratories, 2000.

(Continued)

*Primary Examiner*—Nasser G Moazzami
*Assistant Examiner*—Rebecca L Pachura
(74) *Attorney, Agent, or Firm*—McDermott Will & Emery LLP (57) ABSTRACT

A decryption method of decrypting a plaintext m from a secret exponent d, a public key n, and a ciphertext c includes steps of converting the ciphertext c into a randomized ciphertext t, a step of converting the randomized ciphertext t into a randomized plaintext u, and steps of converting the randomized plaintext u into the plaintext m.

8 Claims, 8 Drawing Sheets

OTHER PUBLICATIONS

T. Takagi, "Fast RSA-type cryptosystem modulo pkq" in the proceedings of CRYPTO 1998, Lecture Notes in Computer Science 1482, Springer-Verlag, pp. 318-326, 1998.

D. Boneh, "Simplified OAEP for the RSA and Rabin Functions" in the proceedings of CRYPTO 2001, Lecture Notes in Computer Science 2139, pp. 275-291, 2001.

Okeya, K; Takagi, T: "Security analysis of CRT-based cryptosystems" Applied Cryptography and Network Security. Second Internation Conference, ACNS 2004. Proceedings, Springer-Verlag, Lecture Notes in Computer Science, vol. 3089, Jun. 8, 2004, pp. 383-394, XP002300996 Yellow Mountain, China.

Boneh D, Brumley D: "Remote Timing Attacks are Practical" Proceedings of the 12th Usenix Security Symposium. 'Online! Aug. 2003, pp. 1-15, XP00230097, URL: http://citeseer.ist.psu.edu.

Bleichenbacher, Daniel; "Chosen Ciphertext Attacks Against Protocols Based on the RSA Encryption Standard PKCS #1", Aug. 1998, 18th Annual International Cryptology Conference, Proceedings, Santa Barbara, California, USA, Abstract Only.

M. Nishika, et al., "Design Analysis of Fast Provably Secure Public-Key Cryptosystems Based on a Modular Squaring" in the proceedings of The 4th International Conference on Information Security and Cryptography (ICISC 2001) Lecture Notes in Computer Science 2288, pp. 81-102, 2001.

* cited by examiner

COMPUTATION METHOD FOR MODULAR EXPONENTIATION OPERATION IN DECRYPTION OR SIGNATURE GENERATION

INCORPORATION BY REFERENCE

This application claims priority based on a Japanese patent application, No. 2004-001602 filed on Jan. 7, 2004, the entire contents of which are incorporated herein by reference.

BACKGROUND OF THE INVENTION

The present invention relates to security technologies, and more particularly to a data processing method using the modular exponentiation operation.

The RSA cryptosystem is the public-key cryptosystem proposed by Rivest, Shamir, and Adleman. The public-key cryptosystem includes information called "public key" which may be open to the general public, and secret information called "private key" which must be kept confidential. The public key is used for encryption of given data and verification of the signature. Meanwhile, the private key is used for decryption of the encrypted given data and generation of the signature.

In the RSA cryptosystem, the private key is defined as large prime numbers p and q and an integer d, while the public key is defined as integers n and e. Among these numerical values, relations:

$$n = pq \quad \text{(expression 1)}$$

$$ed = 1 \bmod \text{Phi}(n) \quad \text{(expression 2)}$$

hold. Here, Phi(n) denotes the Euler function for indicating the number of positive integers which are relatively prime to the integer n. In the case of n=pq, the Euler function is given by $$\text{Phi}(n) = (p-1)(q-1). \quad \text{(expression 3)}$$

From the expression 1 and the expression 2, a relation satisfying $$z^{ed} = z \bmod n \quad \text{(expression 4)}$$

holds for an arbitrary integer z. Taking advantage of this property allows accomplishment of the encryption, the decryption, and the like. Namely, in the encryption and verification of the signature, $$x^e \bmod n \quad \text{(expression 5)}$$

is computed. Meanwhile, in the decryption and generation of the signature, $$y^d \bmod n \quad \text{(expression 6)}$$

is computed. Here, x and y are integers for indicating input data. This type of computation is referred to as "modular exponentiation operation".

In general, for enhancement of the processing speed, the value of e is set as being small compared with the integer n. The value normally used is $$e = 65537 (=2^{16}+1). \quad \text{(expression 7)}$$

Also, as a high-speed implementation technique for speeding up the RSA cryptosystem, the Chinese Remainder Theorem (hereinafter, referred to as "CRT") has been known. Meanwhile, proposals have been made concerning various types of public-key cryptosystems which are created by enhancing performance of the RSA cryptosystem. Their examples are multi-prime RSA, multi-exponent RSA, Rabin cryptosystem, HIME(R), and the like, which have been described in after-mentioned documents 4 to 7. The CRT is applicable to these public-key cryptosystems as well.

When the RSA cryptosystem or the like has been implemented as a cryptographic device, it is possible to observe such information as the computation time and power-consumption amount needed for the cryptographic processing, and accompanying electromagnetic waves. As a result, a proposal has been made regarding a method which, based on these pieces of information, allows revelation of the secret information such as the private key stored inside the cryptographic device. This method is referred to as "side-channel attack". The side-channel attack has been described in P. C. Kocher, J. Jaffe, and B. Jun, "Differential Power Analysis" in the proceedings of CRYPTO 1999, Lecture Notes in Computer Science 1666, Springer-Verlag, pp. 388-397, 1999 (hereinafter document 1).

The side-channel attack on the RSA cryptosystem using the CRT has been described in R. Novak, "SPA-Based Adaptive Chosen-Ciphertext Attack on RSA Implementation" in the proceedings of 2002 International Workshop on Practice and Theory in Public Key Cryptography (PKC2002), Lecture Notes in Computer Science 2274, Springer-Verlag, pp. 252-262, 2002 (hereinafter document 2). This attack, which is referred to as "Novak's attack", is expandable to the above-described public-key cryptosystems as well, i.e., the multi-prime RSA, the multi-exponent RSA, the Rabin cryptosystem, the HIME(R), and the like.

On the other hand, a technique for preventing the side-channel attack has been described in P. C. Kocher, "Timing Attacks on Implementations of Diffie-Hellman, RSA, DSS, and Other Systems" in the proceedings of CRYPTO 1996, Lecture Notes in Computer Science 1109, Springer-Verlag, pp. 104-113, 1996 (hereinafter document 3). The method in the document 3, however, uses the inverse operation that necessitates a tremendous computation amount. Because of this, this method necessitates a tremendous computation time, although it is capable of preventing the side-channel attack. Also, it is possible to compute the inverse operation and store the computed value into a memory in advance. In this case, however, a large amount of memory is used.

SUMMARY OF THE INVENTION

In accompaniment with the developments of information communications networks, the cryptographic technologies have been becoming factors which are absolutely necessary for confidentiality and authentication of electronic information. As requirements to be imposed on the cryptographic technologies, in addition to security, there exist high-speed property and memory-use amount. In particular, in a smart card (which is also referred to as "IC card") or the like, there exist not so many resources available. This condition requires that the cryptographic processing be optimized within the limited resources.

Although the above-described technique is effective as the method for preventing the side-channel attack, no consideration has been given to the high-speed property and the memory-use amount.

The present invention provides a modular exponentiation computation method which is capable of preventing the side-channel attack and simultaneously, which is excellent in the high-speed property and the memory-use amount.

The present invention provides a decryption method of decrypting a plaintext m from a secret exponent d, a public key n, and a ciphertext c in a public-key cryptosystem. Here, the decryption method includes steps of converting the ciphertext c into a randomized ciphertext t, converting the randomized ciphertext t into a randomized plaintext u, and converting the randomized plaintext u into the plaintext m, wherein the step of converting into the randomized ciphertext t includes steps of generating a random number r, and converting into the randomized ciphertext t by using the random number r and an integer s derived from the random number r, the step of converting into the randomized plaintext u including a step of computing the randomized plaintext u by using a value derived from the secret exponent d, the step of converting into the plaintext m including a step of multiplying the randomized plaintext u by the integer s.

The present invention may also be configured such that $r^{e-1}$ is used as the integer s derived from the random number r, where e is the public exponent, and such that the step of converting into the randomized ciphertext t includes a step of multiplying the ciphertext c by sr.

The present invention may also be configured such that d−1 is used as the value derived from the secret exponent d in the step of converting into the randomized plaintext u, and such that the step of converting into the randomized plaintext u includes a step of computing (d−1) exponentiation of the randomized ciphertext t.

The present invention may also be configured such that $r^4$ is used as the value derived from the random number r in the step of converting into the randomized ciphertext t, and such that the step of converting into the randomized ciphertext t includes a step of multiplying the ciphertext c by $r^4$.

The present invention may also be configured such that the public key n includes prime numbers p and q which satisfy p mod 4=q mod 4=3, and such that (p−3)/4 and (q−3)/4 are used as the value derived from the secret exponent d in the step of converting into the randomized plaintext u, and such that the step of converting into the randomized plaintext u includes a step of computing (p−3)/4 exponentiation of the randomized ciphertext t, and a step of computing (q−3)/4 exponentiation of the randomized ciphertext t.

The present invention may also be configured such that $r^2$ is used as the integer s in the step of converting into the plaintext m.

The present invention may also be configured as follows: The present invention provides a signature generation method of generating signature data m from a secret exponent d, a public key n, and data c in a digital signature using a public-key cryptosystem. Here, the signature generation method includes steps of converting the data c into randomized data t, converting the randomized data t into a randomized signature u, and converting the randomized signature u into the signature m.

The present invention may also be configured such that the step of converting into the randomized data t includes steps of generating a random number r, and converting into the randomized data t by using the random number r and an integer s derived from the random number r, the step of converting into the randomized signature u including a step of computing the randomized signature u by using a value derived from the secret exponent d, the step of converting into the signature m including a step of multiplying the randomized signature u by the integer s.

The known randomization in the document 3 works as follows:
1. randomization s=cre mod n
2. decryption u=sd mod n=m r mod n
3. remove the randomization m=u r−1 mod n In this case computing the inverse, that is, r−1, is costly computation.

The present invention, on the other hand, enables to avoid computing the inverse. During the computation of the randomness re mod n, the intermediate value t=re−1 mod n is stored in an additional register. In the decryption step, u=sd−1 mod n is computed using the secret key d−1 instead of the original d. Then message m is obtained by computing utc mod n due to $$utc \bmod n = sd - 1 \; re - 1 \; c \bmod n$$
$$= (mr)e(d - 1)re - 1 \; c \bmod n$$
$$= (mr)1 - e \; re - 1 \; c \bmod n$$
$$= m1 - e \; c \bmod n$$
$$= m1 - e \, me \bmod n$$
$$= m \bmod n.$$

Note that red=r1 mod n.

As explained above, according to the modular exponentiation computation method of the present invention, the input ciphertext is converted into the randomized ciphertext, and there exists no necessity for performing the inverse operation when converting the randomized plaintext into the plaintext. This makes available the modular exponentiation computation method which is capable of preventing the side-channel attack and simultaneously, which is excellent in the high-speed property and the memory-use amount.

According to the present invention, it becomes possible to implement the decryption processing or the signature generation processing in the public-key cryptographic technologies which is secure against the side-channel attack without using the inverse operation and simultaneously, which is excellent in the high-speed property and the memory-use amount.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Hereinafter, referring to the drawings, the explanation will be given below concerning embodiments of the present invention.

Figure 1:
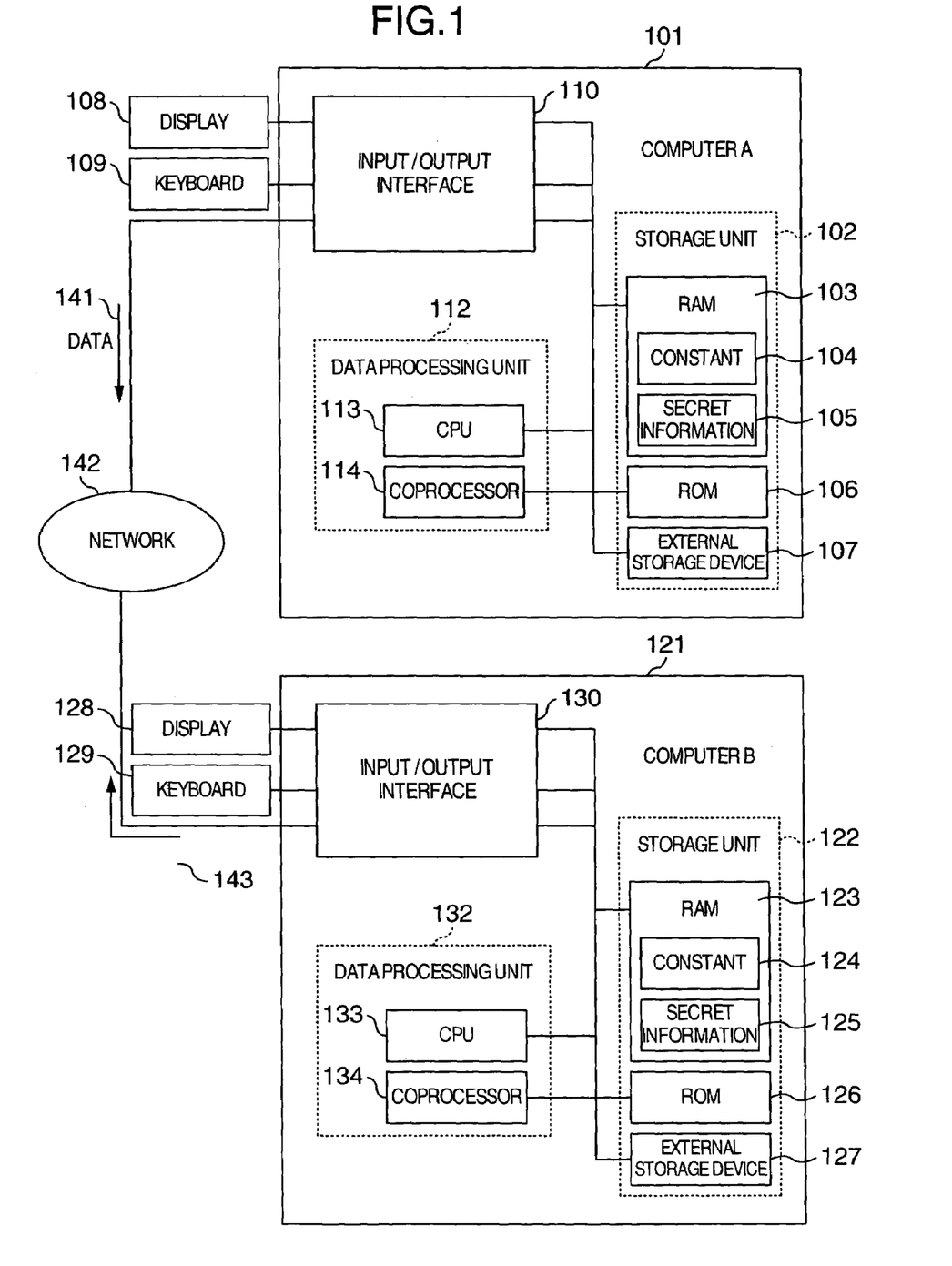
FIG. 1 exemplifies a system configuration diagram in the embodiments.

FIG. 1 illustrates a system configuration where a computer A 101 and a computer B 121, which are connected to each other via a network and to which the computation method for the modular exponentiation operation according to the present invention are applied, are connected to each other via the network 142.

In order to perform encryption of data in the computer A 101 within the cryptographic communications system in FIG. 1, $c=m^e$ mod n is computed and outputted. Meanwhile, in order to perform decryption of the ciphertext in the computer B 121, $c^d$ mod n is computed and outputted. Here, m is an integer for indicating the data to be encrypted, e and n are integers for indicating a public key, c is an integer for indicating the ciphertext with respect to the data m, and d is an integer for indicating a private key.

Only the ciphertext c is transmitted to the network 142, and restoring the data m requires the computing of $c^d$ mod n. However, the private key d is not transmitted to the network 142. As a result, it turns out that only a party that possesses the private key d can restore the data m.

In FIG. 1, the computer A 101 includes arithmetic-logic operation devices such as a CPU 113 and a coprocessor 114, storage devices such as a RAM 103, a ROM 106, and an external storage device 107, and an input/output interface 110 for performing data input/output with the outside of the computer. Devices for a user to operate the computer A 101, such as a display 108, a keyboard 109, and a read/write device of detachable/attachable transportable-type storage medium, are connected thereto at the outside thereof.

Moreover, in the computer A 101, the storage devices, such as the RAM 103, the ROM 106, and the external storage device 107, implement a storage unit 102. Also, the arithmetic-logic operation devices, such as the CPU 113 and the coprocessor 114, execute programs stored in the storage unit 102, thereby implementing a data processing unit 112.

In the present embodiment, the data processing unit 112, as an encryption processing unit 112, performs encryption of inputted data.

The computer B 121 has basically the same hardware configuration as that of the computer A 101.

Furthermore, in the computer B 121, storage devices, such as a RAM 123, a ROM 126, and an external storage device 127, implement a storage unit 122. Also, arithmetic-logic operation devices, such as a CPU 133 and a coprocessor 134, execute programs stored in the storage unit 122, thereby implementing a data processing unit 132.

In the present embodiment, the data processing unit 132, as a decryption processing unit 132, performs decryption of a ciphertext, i.e., encrypted data.

Incidentally, the above-described respective programs may be stored in advance in the storage units within the above-described computers. Otherwise, the respective programs may be introduced when needed into the above-described storage units from another device via the input/output interfaces and a medium made available to the above-described computers. Here, the medium refers to, e.g., a storage medium detachable/attachable from/to the input/output interfaces, or a communications medium (i.e., a network or carrier waves propagating on the network).

Next, the explanation will be given below regarding the operation in the case where the computer A 101 in FIG. 1 performs encryption of inputted data. Here, whatever data is all right as long as it is digital data, and thus the data type, such as text, image, or sound, does not matter.

Having received the inputted plaintext data via the input/output interface 110, the encryption processing unit 112 judges whether or not the bit length of the plaintext data is equal to a predetermined bit length. If the bit length is found to be longer than the predetermined one, the unit 112 separates the plaintext data so that the bit length will become equal to the predetermined one. Hereinafter, the explanation will be given below regarding partial data (also referred to as simply "data") which has been separated into the predetermined bit length.

Next, the encryption processing unit 112 computes a modular exponentiation $c=m^e$ mod n with respect to the numerical value m represented by the bit string of the data, thereby acquiring encrypted data c. The computer A 101 assembles encrypted output data from the one or more pieces of partial data encrypted by the encryption processing unit 112. The computer A 101 outputs the encrypted data 141 from the input/output interface 110, then transferring the data 141 to the computer B 121 via the network 142.

Next, the explanation will be given below concerning the operation in the case where the computer B 121 performs decryption of the encrypted data 141.

Having received the encrypted data inputted via the input/output interface 130, the decryption processing unit 132 judges whether or not the bit length of the encrypted data inputted is equal to a predetermined bit length. If the bit length is found to be longer than the predetermined one, the unit 132 separates the encrypted data so that the bit length will become equal to the predetermined one. Hereinafter, the explanation will be given below regarding partial data (also referred to as simply "data") which has been separated into the predetermined bit length.

Next, the decryption processing unit 132 computes a modular exponentiation $m'=c^d$ mod n with respect to the numerical value c represented by the bit string of the encrypted data, thereby acquiring m' which is equivalent to the partial data m before being encrypted. The computer B 121 assembles the plaintext data from the pieces of partial data decrypted by the decryption processing unit 132, then outputting the plaintext data from the display 128 or the like via the input/output interface 130.

Next, the detailed explanation will be given below regarding the processing by the data processing unit 132 in the case where the computer B 121 performs the decryption processing.

Embodiment 1

Figure 2:
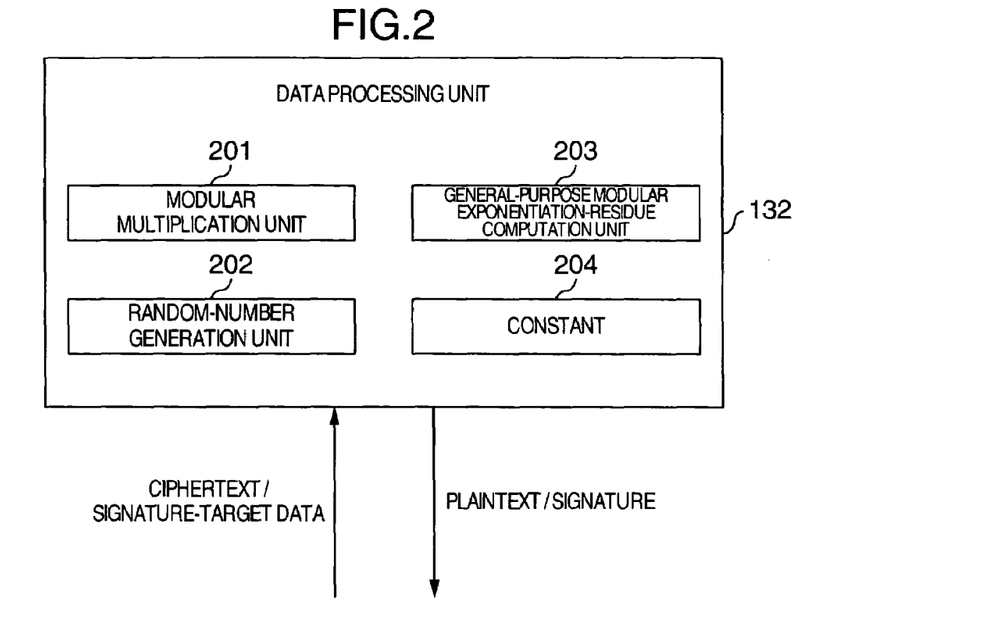
FIG. 2 exemplifies a configuration diagram of the data processing unit in the first embodiment.

In a first embodiment, function blocks of the data processing unit 132 illustrated in FIG. 2 are used as the decryption processing unit 132. The data processing unit 132 includes a modular multiplication unit 201, a random-number generation unit 202, a general-purpose modular exponentiation computation unit 203, and a constant 204.

Figure 3:
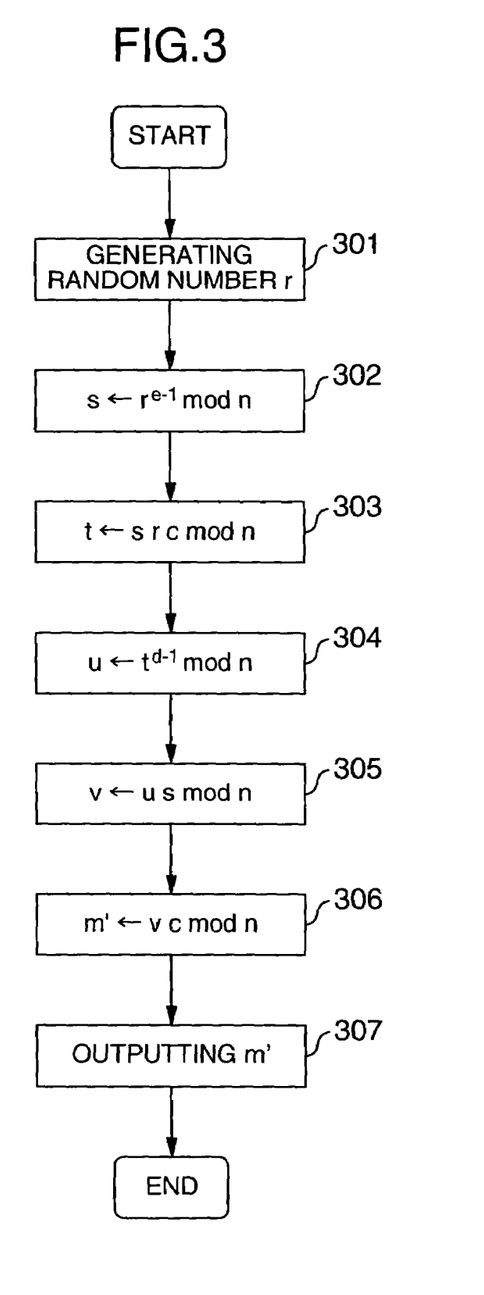
FIG. 3 exemplifies a flowchart diagram for illustrating the decryption processing in the first embodiment.

Next, referring to FIG. 3, the explanation will be given below concerning a first computation method by which, using the private key d, the decryption processing unit 132 computes the plaintext m, i.e., the partial data before being encrypted, from the ciphertext c which has been separated into the predetermined bit length.

The decryption processing unit 132 receives the ciphertext c.

The random-number generation unit 202 generates a random number r (301).

The general-purpose modular exponentiation computation unit 203 computes $r^{e-1}$ mod n, then storing the result into s (302).

The modular multiplication unit 201 computes src mod n, then storing the result into t (303). This computation can be accomplished such that the modular multiplication unit 201 computes sr mod n from s and r, and after that, computes (sr)c mod n.

The general-purpose modular exponentiation computation unit 203 computes $t^{d-1}$ mod n, then storing the result into u (304).

The modular multiplication unit 201 computes us mod n, then storing the result into v (305).

The modular multiplication unit 201 computes vc mod n, then storing the result into m' (306).

The decryption processing unit 132 outputs m' as the plaintext m, i.e., the partial data before being encrypted (307).

The plaintext data is assembled from the plaintext m.

Figure 4:
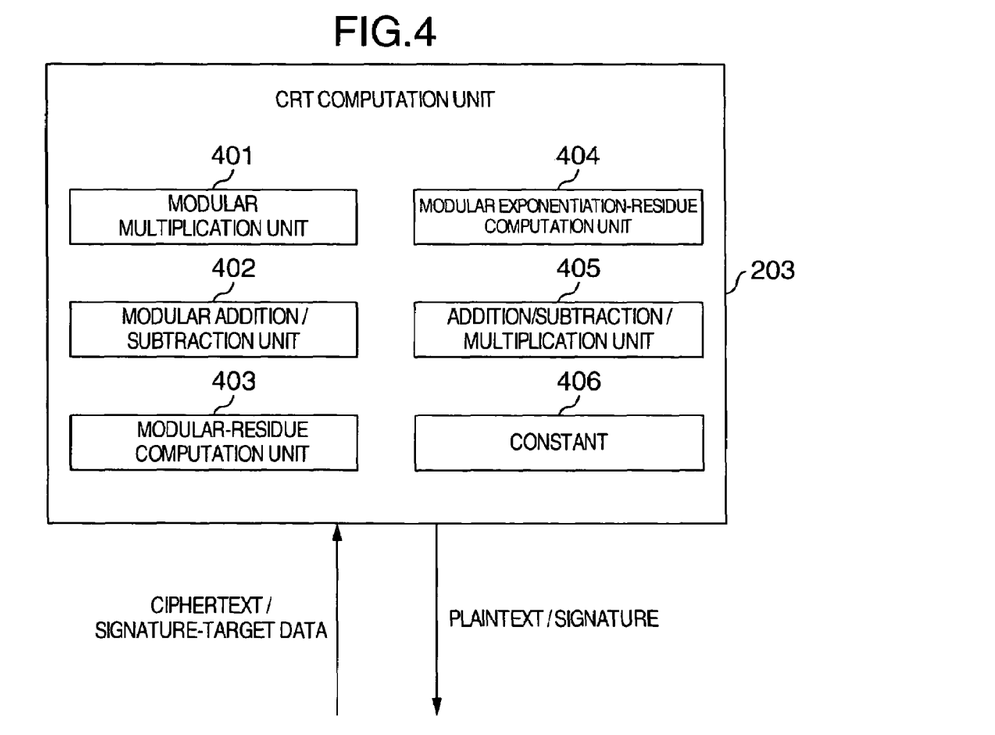
FIG. 4 exemplifies a configuration diagram of the CRT computation unit in the first embodiment.
Figure 5:
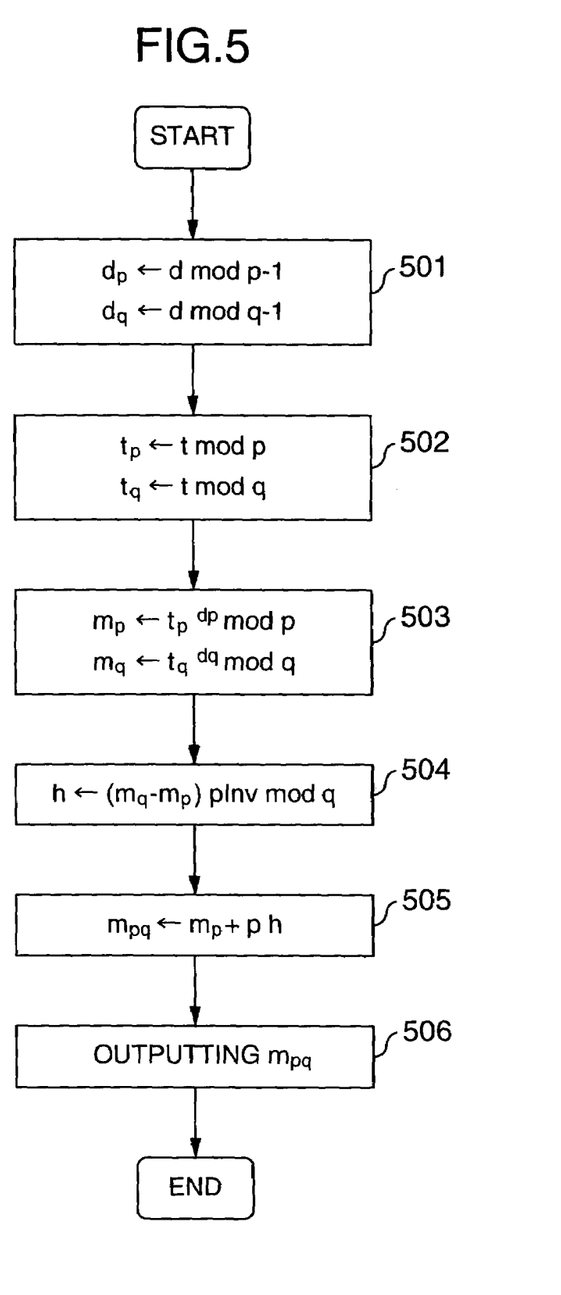
FIG. 5 exemplifies a flowchart diagram for illustrating the computation method that the CRT computation unit performs in the first embodiment.

Next, referring to FIG. 4 and FIG. 5, the explanation will be given below regarding the processing in the case of speeding up the general-purpose modular exponentiation operation by using the Chinese Remainder Theorem. In this case, the general-purpose modular exponentiation computation unit 203 functions as a CRT computation unit 203.

The CRT computation unit 203 includes a modular multiplication unit 401, a modular addition/subtraction unit 402, a modular-residue computation unit 403, a modular exponentiation computation unit 404, an addition/subtraction/multiplication unit 405, and a constant 406. The CRT computation unit 203 computes $t^d$ mod n from the integer t and the integer d, using prime numbers p and q. Here, p and q are the prime numbers which can divide n with no residue left.

The CRT computation unit 203 receives the integer t and the integer d.

The modular-residue computation unit 403 computes d mod p−1 and d mod q−1, then storing the results into $d_p$ and $d_q$ respectively (501).

The modular-residue computation unit 403 computes t mod p and t mod q, then storing the results into $t_p$ and $t_q$ respectively (502).

The modular exponentiation computation unit 404 computes $t_p^{dp}$ mod p and $t_q^{dq}$ mod q, then storing the results into $m_p$ and $m_q$ respectively (503).

The modular multiplication unit 401 and the modular addition/subtraction unit 402 compute $(m_q-m_p)$pInv mod q, then storing the result into h (504). This computation can be accomplished such that the modular addition/subtraction unit 402 computes $m_q-m_p$ mod q, and such that the modular multiplication unit 401 multiplies the result by pInv (i.e., $(m_q-m_p)$pInv mod q).

The addition/subtraction/multiplication unit 405 computes $m_p+$ph, then storing the result into $m_{pq}$ (505). This computation can be accomplished such that the addition/subtraction/multiplication unit 405 computes ph, and adds $m_p$ to the result (i.e., $m_p+$(ph)). Here, pInv is an integer satisfying $$\text{pInv}=p^{-1} \bmod q. \quad \text{(expression 8)}$$

The integer pInv is stored in the CRT computation unit 203 as the constant 406.

The CRT computation unit 203 outputs $m_{pq}$ as $t^d$ mod n (506).

The data m', which is outputted by the processing that the decryption processing unit 132 performs, satisfies m'=m. The reason for this is as follows:

$$m' = vc = usc = t^{d-1}sc = (src)^{d-1}sc = \quad \text{(expression 9)}$$
$$(r^ec)^{d-1}r^{e-1}c = c^d \; r^{ed-e+e-1} = c^d \bmod n$$

Here, from the definition of e and d, $r^{ed-1}=1$ holds. Moreover, since c is the data resulting from encrypting m, $$c^d=\text{m mod n} \quad \text{(expression 10)}$$

holds. The expressions 9 and 10 indicates that m'=m holds.

In the above-described first computation method, no inverse operation is used although the operations such as the modular multiplications are used. Accordingly, the computation method allows implementation of the higher-speed computation as compared with the technique described in the document 3. Also, in the case where e has been determined by the expression 7, as compared with the method of directly computing $c^d$ mod n, an increase in the computation amount proves equivalent to the amount of the 20-time modular multiplications. Here, in general, execution of the 1024-bit general-purpose modular exponentiation operation necessitates substantially 1500-time modular multiplications. Consequently, it can be said that the computation-amount increase in the above-described computation method is comparatively small in comparison with this value.

Also, since no inverse operation is used in the above-described computation method, there exists no necessity for computing the inverse operation and storing the computed value into the memory in advance. This means that the memory-use amount to be needed is a small one.

Also, the above-described computation method is also effective for defense against the side-channel attack. The reason for this is as follows: In the above-described computation method, the step or steps at which the private key is used is, after all, the step 304 alone. The integer t, i.e., the inputted value at the step 304, is the multiplication result acquired by multiplying the inputted data c by the e exponentiation of the random number r generated at the step 301. Accordingly, the attacker finds it impossible to predict the value of the integer t. In general, the Novak's attack is made by taking advantage of the situation where the value to be inputted into the general-purpose modular exponentiation operation has been already known to the attacker. Consequently, the attacker finds it impossible to make the Novak's attack.

As explained above, the above-described computation method exhibits immunity against the side-channel attack, since the method reveals none of the information useful for the side-channel attack. Also, the method allows implementation of the high-speed computation, since the method uses no inverse operation. Moreover, the method guarantees that the memory-use amount to be needed is a small one, since the method accompanies none of the necessity for storing in advance the result of the inverse operation into the memory.

Incidentally, the above-described computation method is also applicable to the multi-prime RSA and the multi-exponent RSA. In these cases as well, the method exhibits the immunity against the side-channel attack, and further, allows the high-speed computation and implements the small memory-use since the method uses no inverse operation.

First, the explanation will be given below concerning the case of the multi-prime RSA.

As disclosed in Public-Key Cryptography Standards, PKCS # 1, Amendment 1: Multi-prime RSA, RSA Laboratories, 2000 (hereinafter document 4), in the multi-prime RSA, the private key is defined as large prime numbers p, q and r and an integer d, while the public key is defined as integers n and e. Among these numerical values, relations:

$$n=pqr \quad \text{(expression 11)}$$

$$ed=1 \bmod \mathrm{Phi}(n) \quad \text{(expression 12)}$$

hold. Here, the number of the large prime numbers is set as 3, but may also be set as 4 or more. In the case of n of the expression 11, Phi(n) is given by $$\mathrm{Phi}(n)=(p-1)(q-1)(r-1). \quad \text{(expression 13)}$$

The expression 4 holds in the multi-prime RSA as well. On account of this, the expression 5 is computed in the encryption and verification of the signature, while the expression 6 is computed in the decryption and generation of the signature. Accordingly, when performing the decryption processing, by using the first computation method, the multi-prime RSA exhibits the immunity against the side-channel attack, and further, allows the high-speed computation and implements the small memory-use since the method uses no inverse operation.

Figure 6:
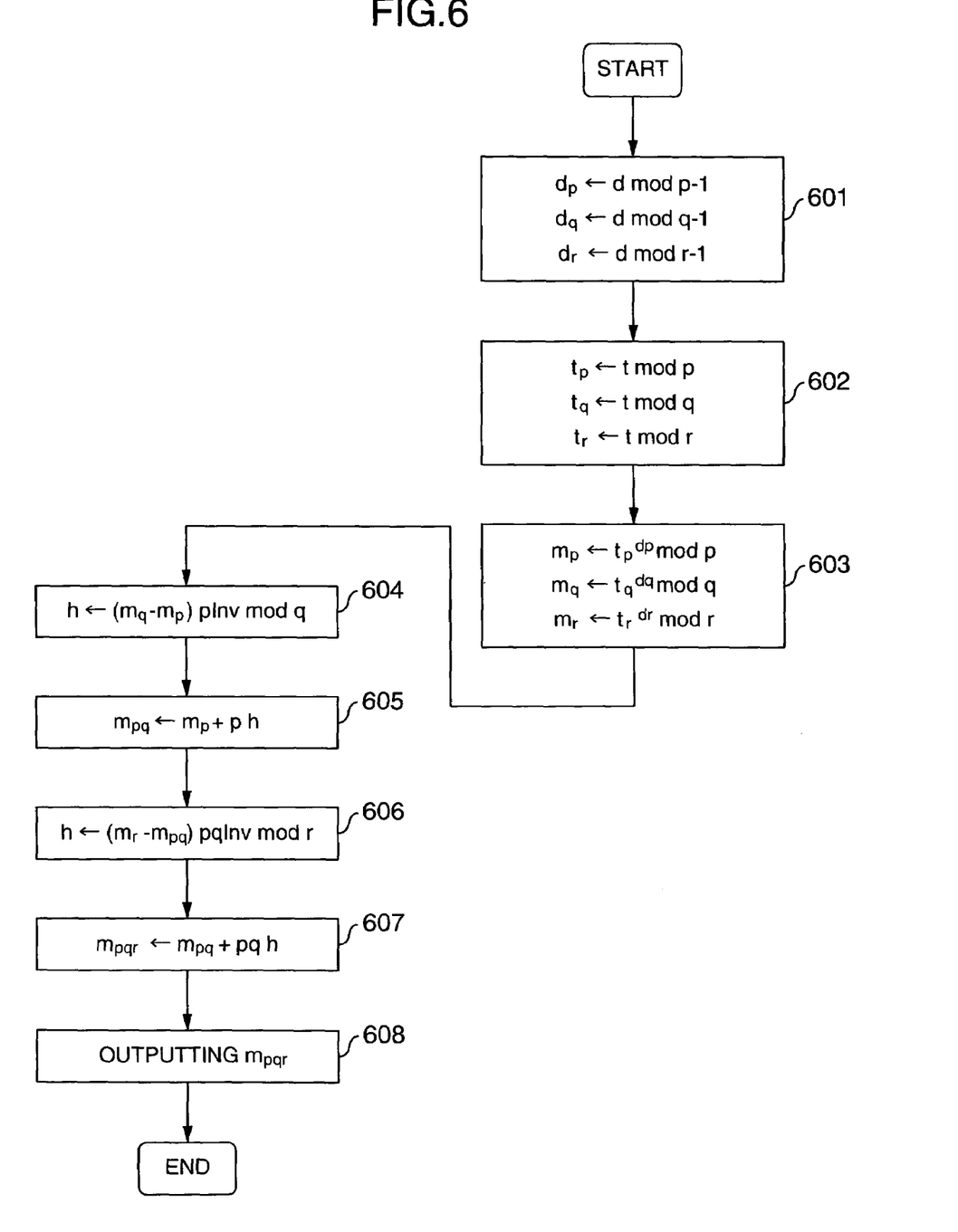
FIG. 6 exemplifies a flowchart diagram for illustrating the computation method that the CRT computation unit performs in the first embodiment.

Next, referring to FIG. 4 and FIG. 6, the explanation will be given below regarding the processing in the case of speeding up the general-purpose modular exponentiation operation by using the Chinese Remainder Theorem. In this case, the general-purpose modular exponentiation computation unit 203 functions as the CRT computation unit 203.

The CRT computation unit 203 computes $t^d \bmod n$ from the integer t and the integer d, using the prime numbers p, q and r. Here, p, q and r are the prime numbers which can divide n with no residue left.

The CRT computation unit 203 receives the integer t and the integer d.

The modular-residue computation unit 403 computes d mod p−1 and d mod q−1, and d mod r−1, then storing the results into $d_p$, $d_q$, and $d_r$ respectively (601).

The modular-residue computation unit 403 computes t mod p, t mod q, and t mod r, then storing the results into $t_p$, $t_q$, and $t_r$ respectively (602).

The modular exponentiation computation unit 404 computes $t_p^{dp} \bmod p$, $t_q^{dq} \bmod q$, and $t_r^{dr} \bmod r$, then storing the results into $m_p$, $m_q$, and $m_r$ respectively (603).

The modular multiplication unit 401 and the modular addition/subtraction unit 402 compute $(m_q-m_p)\mathrm{pInv} \bmod q$, then storing the result into h (604). This computation can be accomplished such that the modular addition/subtraction unit 402 computes $(m_q-m_p) \bmod q$, and such that the modular multiplication unit 401 multiplies the result by pInv (i.e., $(m_q-m_p)\mathrm{pInv} \bmod q$). Here, pInv is the integer satisfying the expression 8.

The addition/subtraction/multiplication unit 405 computes $m_p+\mathrm{ph}$, then storing the result into $m_{pq}$ (605). This computation can be accomplished such that the addition/subtraction/multiplication unit 405 computes ph, and adds $m_p$ to the result (i.e., $m_p+(\mathrm{ph})$).

The modular multiplication unit 401 and the modular addition/subtraction unit 402 compute $(m_r-m_{pq})\mathrm{pqInv} \bmod r$, then storing the result into h (606). This computation can be accomplished such that the modular addition/subtraction unit 402 computes $m_r-m_{pq} \bmod r$, and such that the modular multiplication unit 401 multiplies the result by pqInv (i.e., $(m_r-m_{pq})\mathrm{pqInv} \bmod r$). Here, pqInv is an integer satisfying $$\mathrm{pqInv}=(pq)^{-1} \bmod r. \quad \text{(expression 14)}$$

The integer pqInv is stored in the CRT computation unit 203 as the constant 406.

The addition/subtraction/multiplication unit 405 computes $m_{pq}+\mathrm{pqh}$, then storing the result into $m_{pqr}$ (607). This computation can be accomplished such that the addition/subtraction/multiplication unit 405 computes pq, multiplies the result by h, and further, adds $m_{pq}$ to the result (i.e., $m_{pq}+((pq)h)$).

The CRT computation unit 203 outputs $m_{pqr}$ as $t^d \bmod n$ (608).

Next, the explanation will be given below regarding the case of the multi-exponent RSA.

As disclosed in T. Takagi, "Fast RSA-type cryptosystem modulo pkq" in the proceedings of CRYPTO 1998, Lecture Notes in Computer Science 1462, Springer-Verlag, pp. 318-326, 1998 (hereinafter document 5), in the multi-exponent RSA, the private key is defined as large prime numbers p and q and an integer d, while the public key is defined as integers n and e. Among these numerical values, relations:

$$n=p^2 q \quad \text{(expression 15)}$$

$$ed=1 \bmod \mathrm{Phi}(n) \quad \text{(expression 16)}$$

hold. Here, the exponent is set as 2, but may also be set as 3 or more. In the case of n of the expression 15, Phi(n) is given by $$\mathrm{Phi}(n)=p(p-1)(q-1). \quad \text{(expression 17)}$$

The expression 4 holds in the multi-exponent RSA as well. On account of this, the expression 5 is computed in the encryption and verification of the signature, while the expression 6 is computed in the decryption and generation of the signature. Consequently, when performing the decryption processing, by using the first computation method, the multi-exponent RSA exhibits the immunity against the side-channel attack, and further, allows the high-speed computation and implements the small memory-use since the method uses no inverse operation.

Figure 7:
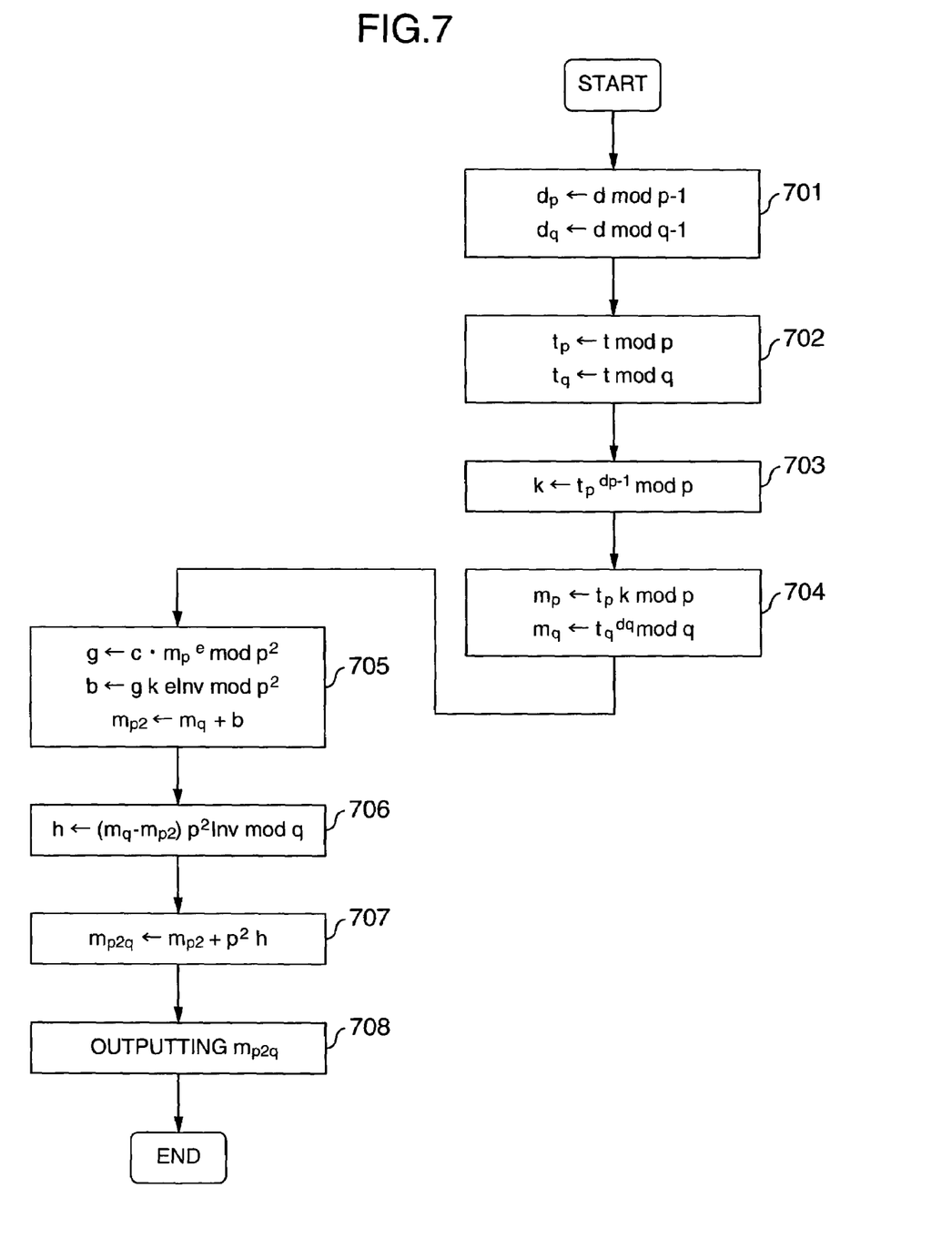
FIG. 7 exemplifies a flowchart diagram for illustrating the computation method that the CRT computation unit performs in the first embodiment.

Next, referring to FIG. 4 and FIG. 7, the explanation will be given below concerning the processing in the case of speeding up the general-purpose modular exponentiation operation by using the Chinese Remainder Theorem. In this case, the general-purpose modular exponentiation computation unit 203 functions as the CRT computation unit 203.

The CRT computation unit 203 computes $t^d \bmod n$ from the integer t and the integer d, using the prime numbers p and q. Here, p and q are the prime numbers which can divide n with no residue left. Moreover, n can also be divided by $p^2$ with no residue left.

The CRT computation unit 203 receives the integer t and the integer d.

The modular-residue computation unit 403 computes d mod p−1 and d mod q−1, then storing the results into dp and dq respectively (701) The modular-residue computation unit 403 computes t mod p and t mod q, then storing the results into $t_p$ and $t_q$ respectively (702).

The modular exponentiation computation unit 404 computes $t_p^{dp-1} \bmod p$, then storing the result into k (703).

The modular-residue computation unit 403 computes $t_p k$ mod p, then storing the result into $m_p$. Also, the modular exponentiation computation unit 404 computes $t_q^{dq} \bmod q$, then storing the result into $m_q$ (704).

The modular exponentiation computation unit 404, the modular addition/subtraction unit 402, and the modular-residue computation unit 403 compute $c-m_p^e$ mod $p^2$, then storing the result into g. Also, the modular multiplication unit 401 computes gkeInv mod $p^2$, then storing the result into b. Also, the addition/subtraction/multiplication unit 405 computes $m_q+b$, then storing the result into $m_{p2}$ (705). These computations can be accomplished as follows: The result to be stored into g can be computed such that the modular exponentiation computation unit 404 computes $m_p^e$ mod $p^2$, and such that the modular-residue computation unit 403 computes c mod $p^2$, and such that the modular addition/subtraction unit 402 takes the difference therebetween (i.e., (c mod $p^2$)−($m_p^e$ mod $p^2$)). The result to be stored into b can be computed such that the modular multiplication unit 401 computes gk mod $p^2$, and multiplies the result by eInv (i.e., (gk)eInv mod $p^2$) After that, the addition/subtraction/multiplication unit 405 computes $m_q+b$. Here, eInv is an integer satisfying $$eInv=(e)^{-1} \bmod p. \quad \text{(expression 18)}$$

The integer eInv is stored in the CRT computation unit 203 as the constant 406.

The modular multiplication unit 401 and the modular addition/subtraction unit 402 compute $(m_q-m_{p2})p^2$Inv mod q, then storing the result into h (706). This computation can be accomplished such that the modular addition/subtraction unit 402 computes $m_q-m_{p2}$ mod q, and such that the modular multiplication unit 401 multiplies the result by $p^2$Inv (i.e., $(m_q-m_{p2})p^2$Inv mod q). Here, $p^2$Inv is an integer satisfying $$p^2Inv=(p^2)^{-1} \bmod r. \quad \text{(expression 19)}$$

The integer $p^2$Inv is stored in the CRT computation unit 203 as the constant 406.

The addition/subtraction/multiplication unit 405 computes $M_{p2}+p^2h$, then storing the result into $m_{p2q}$ (707). This computation can be accomplished such that the addition/subtraction/multiplication unit 405 computes $(p^2)$ h, and adds $m_{p2}$ to the result (i.e., $m_{p2}+((p^2)h)$).

The CRT computation unit 203 outputs $m_{p2q}$ as $t^d$ mod n (708).

Embodiment 2

In a second embodiment, the explanation will be given below concerning the case of the Rabin cryptosystem.

As disclosed in D. Boneh, "Simplified OAEP for the RSA and Rabin Functions" in the proceedings of CRYPTO 2001, Lecture Notes in Computer Science 2139, pp. 275-291, 2001 (hereinafter document 6), in the Rabin cryptosystem, the private key is defined as large prime numbers p and q, while the public key is defined as integers n and e. In particular, in the case of the Rabin cryptosystem, $$e=2 \quad \text{(expression 20)}$$

is set. Also, the prime numbers p and q are selected so that $$p \bmod 4 = q \bmod 4 = 3 \quad \text{(expression 21)}$$

will be satisfied. Among these numerical values, a relation:

$$n=pq \quad \text{(expression 22)}$$

holds. In the case of the Rabin cryptosystem, in the encryption and verification of the signature, the square residue of x:

$$y=x^2 \bmod n \quad \text{(expression 23)}$$

is computed. Meanwhile, in the decryption and generation of the signature, x which satisfies the expression 23 is computed. On account of this, in the Rabin cryptosystem, there exist four integers which satisfy the expression 23. Accordingly, it turns out that an appropriate integer will be selected out of them.

Figure 8:
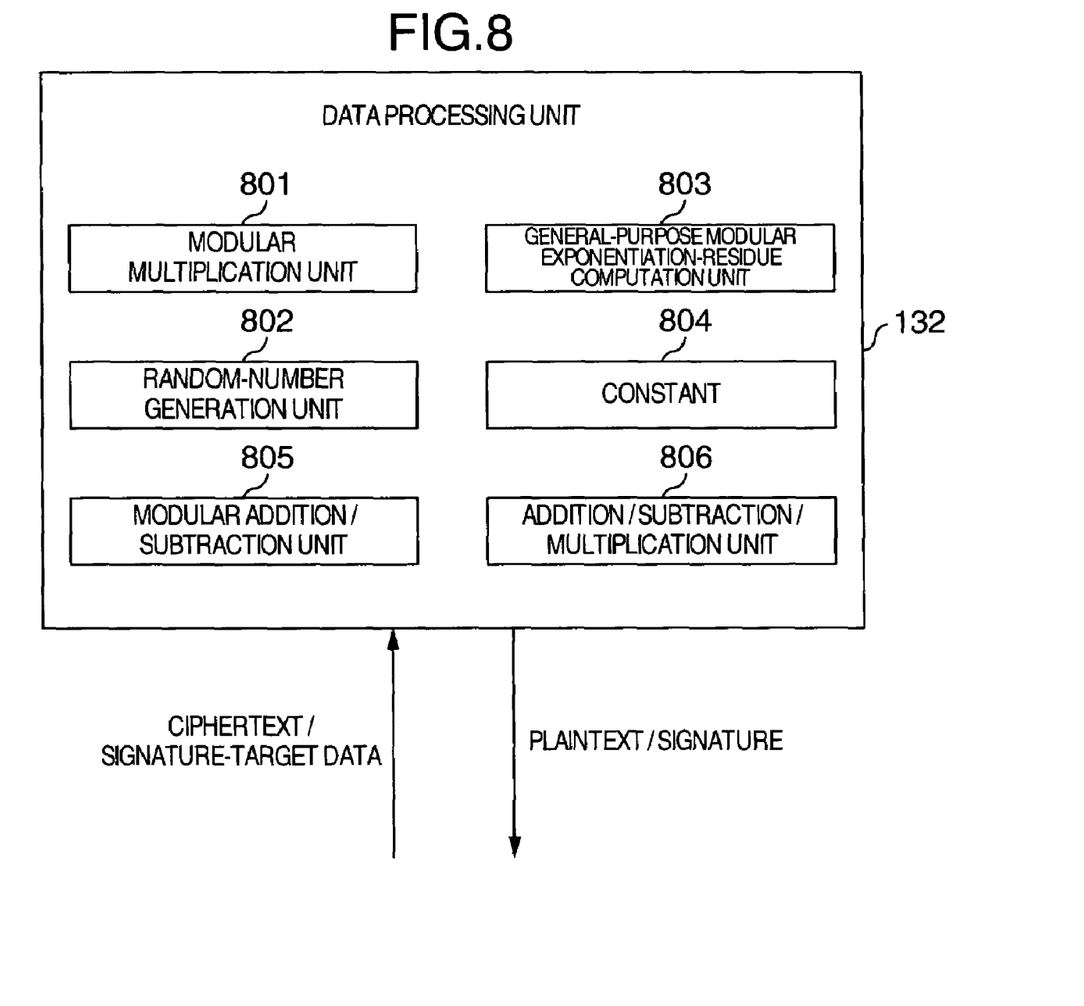
FIG. 8 exemplifies a configuration diagram of the data processing unit in the second and third embodiments.

In the second embodiment, function blocks of the data processing unit 132 illustrated in FIG. 8 are used as the decryption processing unit 132. The data processing unit 132 includes a modular multiplication unit 801, a random-number generation unit 802, a general-purpose modular exponentiation computation unit 803, a constant 804, a modular addition/subtraction unit 805, and an addition/subtraction/multiplication unit 806.

Figure 9:
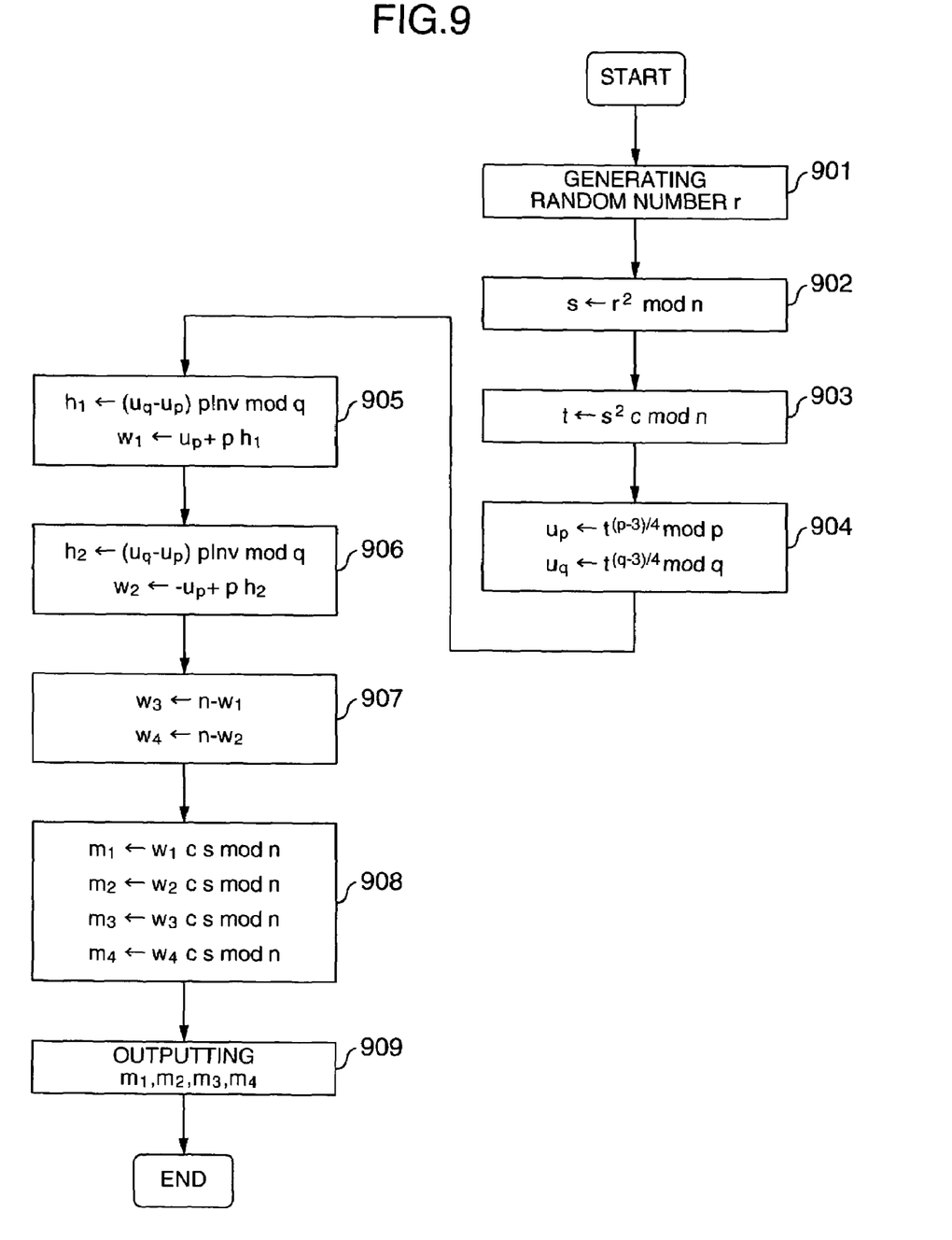
FIG. 9 exemplifies a flowchart diagram for illustrating the decryption processing in the second embodiment.

Next, referring to FIG. 9, the explanation will be given below concerning a second computation method by which, using the private key d, the decryption processing unit 132 computes the plaintext m from the ciphertext c which has been separated into the predetermined bit length.

The decryption processing unit 132 receives the ciphertext c.

The random-number generation unit 802 generates a random number r (901).

The modular multiplication unit 801 computes $r^2$ mod n, then storing the result into s (902).

The modular multiplication unit 801 computes $s^2c$ mod n, then storing the result into t (903). This computation can be accomplished such that the modular multiplication unit 801 computes $s^2$ mod n from s, and after that, computes $(s^2)c$ mod n.

The general-purpose modular exponentiation computation unit 803 computes $t^{(p-3)/4}$ mod p and $t^{(q-3)/4}$ mod q, then storing the results into $u_p$ and $u_q$ respectively (904).

The modular multiplication unit 801 and the modular addition/subtraction unit 805 compute $(u_q-u_p)$pInv mod q, then storing the result into $h_1$. Also, the addition/subtraction/multiplication unit 806 computes $u_p+ph_1$, then storing the result into $w_1$ (905). These computations can be accomplished as follows: The result to be stored into $h_1$ can be computed such that the modular addition/subtraction unit 805 computes $u_q-u_p$ mod q, and such that the modular multiplication unit 801 multiplies the result by pInv (i.e., $(u_q-u_p)$pInv mod q). After that, the addition/subtraction/multiplication unit 806 computes $ph_1$, and adds up to the result (i.e., $u_p+(ph_1)$). Here, pInv is the integer satisfying the expression 8.

The modular multiplication unit 801 and the modular addition/subtraction unit 805 compute $(u_q+u_p)$pInv mod q, then storing the result into $h_2$. Also, the addition/subtraction/multiplication unit 806 computes $-u_p+ph_2$, then storing the result into $w_2$ (906). These computations can be accomplished as follows: The result to be stored into $h_2$ can be computed such that the modular addition/subtraction unit 805 computes $u_q+u_p$ mod q, and such that the modular multiplication unit 801 multiplies the result by pInv (i.e., $(u_q+u_p)$pInv mod q). After that, the addition/subtraction/multiplication unit 806 computes $ph_2$, and subtracts up from the result (i.e., $-u_p+(ph_2)$).

The addition/subtraction/multiplication unit 806 computes $n-w_1$ and $n-w_2$, then storing the results into $w_3$ and $W_4$ respectively (907).

The modular multiplication unit 801 computes $w_1cs$ mod n, $w_2cs$ mod n, $w_3CS$ mod n, and $w_4CS$ mod n, then storing the results into $m_1$, $m_2$, $m_3$, and $m_4$ respectively (908). These computations can be accomplished such that the modular multiplication unit 801 computes cs mod n, and multiplies the result by $w_1$, $w_2$, $w_3$, and $w_4$ respectively.

The decryption processing unit 132 outputs $m_1$, $m_2$, $m_3$, and $m_4$ as candidates of the plaintext m (909).

The data $m_1$, $m_2$, $m_3$, and $m_4$, which are outputted by the processing that the decryption processing unit 132 performs, satisfy $$m_1^2 = m_2^2 = m_3^2 m_4^2 = c \bmod n \quad \text{(expression 24)}$$

The reason for this is as follows: First, the following expression holds with respect to $u_p$:

$$u_p^2 = (t^{(p-3)/4})^2 = (s^2 c)^{(p-3)/2} = s^{p-3} m^{p-3} \bmod p. \quad \text{(expression 25)}$$

Here, note that, since p is the prime number, $$z^p = z \bmod p \quad \text{(expression 26)}$$

holds for an arbitrary integer z. As a result, $$u_p^2 = s^{-2} m^{-2} \bmod p \quad \text{(expression 27)}$$

holds. Similarly, $$u_q^2 = s^{-2} m^{-2} \bmod q \quad \text{(expression 28)}$$

holds. Meanwhile, the following expressions hold with respect to $w_1$:

$$w_1^2 = u_p^2 \bmod p \quad \text{(expression 29)}$$

$$w_1^2 = (u_p + p(u_q - u_p) pInv)^2 \bmod q \quad \text{(expression 30)}$$

Since pInv satisfies the expression 8, $$w_1^2 = u_q^2 \bmod q \quad \text{(expression 31)}$$

holds. Giving consideration to the expression 22, the expression 27, the expression 28, the expression 29, and the expression 31 indicates that $$m_1^2 = w_1^2 c^2 s^2 \bmod n = c \bmod n \quad \text{(expression 32)}$$

holds. It can be shown similarly that the expression 24 holds for $m_2$, $m_3$, and $m_4$ as well.

In the above-described second computation method, no inverse operation is used although the operations such as the modular multiplications are used. Accordingly, the computation method allows implementation of the higher-speed computation as compared with the technique described in the document 3. Also, since e=2 has been set, as compared with the normal computation technique in the Rabin cryptosystem, an increase in the computation amount proves equivalent to the amount of the 5-time modular multiplications. Here, in general, execution of the 1024-bit general-purpose modular exponentiation operation necessitates substantially 1500-time modular multiplications. Consequently, it can be said that the computation-amount increase in the above-described computation method is comparatively small in comparison with this value.

Also, since no inverse operation is used in the above-described computation method, there exists no necessity for computing the inverse operation and storing the computed value into the memory in advance. This means that the memory-use amount to be needed is a small one.

Also, the above-described computation method is also effective for defense against the side-channel attack. The reason for this is as follows: In the above-described computation method, the step at which the private key is used for the first time is the step 904. In the operations thereinafter, the operation result at the step 904 is used. The integer t, i.e., the inputted value at the step 904, is the multiplication result acquired by multiplying the inputted data c by the four exponentiation of the random number r generated at the step 901. Accordingly, the attacker finds it impossible to predict the value of the integer t. In general, the Novak's attack is made by taking advantage of the situation where the value to be inputted into the general-purpose modular exponentiation operation has been already known to the attacker. Consequently, the attacker finds it impossible to make the Novak's attack.

As explained above, the above-described computation method exhibits immunity against the side-channel attack, since the method reveals none of the information useful for the side-channel attack. Also, the method allows implementation of the high-speed computation, since the method uses no inverse operation. Moreover, the method guarantees that the memory-use amount to be needed is a small one, since the method accompanies none of the necessity for storing in advance the result of the inverse operation into the memory.

Incidentally, at the step 906, the computations may also be executed in such a manner that $-u_p$ is replaced by $p-u_p$. This replacement allows the computations to be executed without dealing with the negative integer, thereby making it possible to simplify the programs.

Embodiment 3

In a third embodiment, the explanation will be given below concerning the case of the HIME(R).

As disclosed in M. Nishioka, H. Satoh, and K. Sakurai, "Design and Analysis of Fast Provably Secure Public-Key Cryptosystems Based on a Modular Squaring" in the proceedings of The 4th International Conference on Information Security and Cryptography (ICISC 2001), Lecture Notes in Computer Science 2288, pp. 81-102, 2001 (hereinafter document 7), in the HIME(R), the private key is defined as large prime numbers p and q, while the public key is defined as integers n and e. In the case of the HIME(R), similarly to the Rabin cryptosystem, e is selected so that the expression 20 will be satisfied. Also, the prime numbers p and q are selected so that the expression 21 will be satisfied. Among these numerical values, a relation:

$$n = p^2 q \quad \text{(expression 33)}$$

holds. In the case of the HIME(R), in the encryption and verification of the signature, the square residue of x:

$$y = x^2 \bmod n \quad \text{(expression 34)}$$

is computed. Meanwhile, in the decryption and generation of the signature, x which satisfies the expression 34 is computed. On account of this, in the HIME(R), there exist four integers which satisfy the expression 34. Accordingly, it turns out that an appropriate integer will be selected out of them.

In the third embodiment, the function blocks of the data processing unit 132 illustrated in FIG. 8 are used as the decryption processing unit 132.

Figure 10:
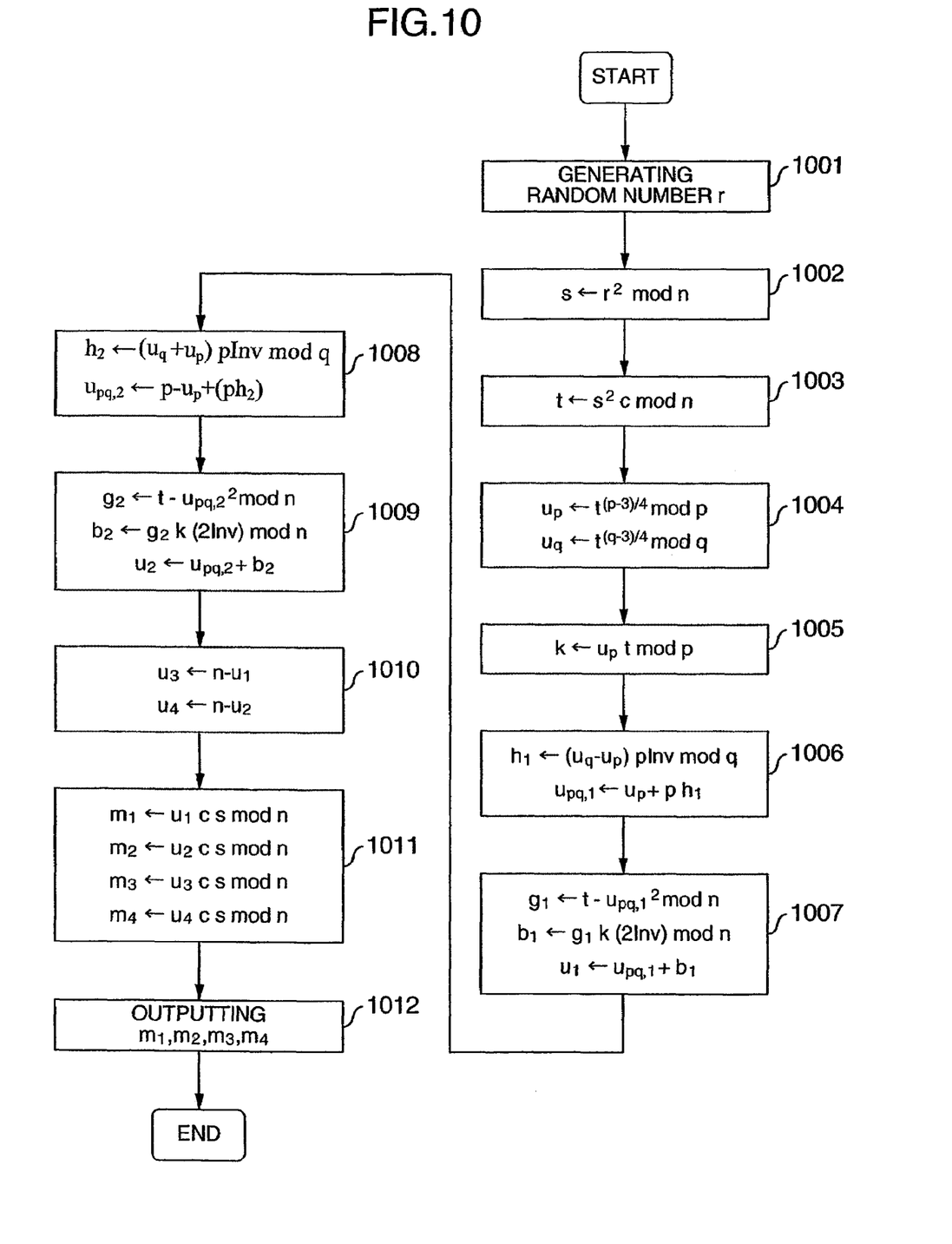
FIG. 10 exemplifies a flowchart diagram for illustrating the decryption processing in the third embodiment.

Next, referring to FIG. 10, the explanation will be given below concerning a third computation method by which, using the private key d, the decryption processing unit 132 computes the plaintext m from the ciphertext c which has been separated into the predetermined bit length.

The decryption processing unit 132 receives the ciphertext c.

The random-number generation unit 802 generates a random number r (1001).

The modular multiplication unit 801 computes $r^2 \bmod n$, then storing the result into s (1002).

The modular multiplication unit 801 computes $s^2 c \bmod n$, then storing the result into t (1003). This computation can be accomplished such that the modular multiplication unit 801 computes $s^2$ mod n from s, and after that, computes $(s^2)c$ mod n.

The general-purpose modular exponentiation computation unit 803 computes $t^{(p-3)/4}$ mod p and $t^{(q-3)/4}$ mod q, then storing the results into $u_p$ and $u_q$ respectively (1004).

The modular multiplication unit 801 computes $u_p t$ mod p, then storing the result into k (1005).

The modular multiplication unit 801 and the modular addition/subtraction unit 805 compute $(u_q - u_p)$pInv mod q, then storing the result into $h_1$. Also, the addition/subtraction/multiplication unit 806 computes $u_p + ph_1$, then storing the result into $u_{pq,1}$ (1006) These computations can be accomplished as follows: The result to be stored into $h_1$ can be computed such that the modular addition/subtraction unit 805 computes $u_q - u_p$ mod q, and such that the modular multiplication unit 801 multiplies the result by pInv (i.e., $(u_q - u_p)$pInv mod q). After that, the addition/subtraction/multiplication unit 806 computes $ph_1$, and adds $u_p$ to the result (i.e., $u_p + (ph_1)$). Here, pInv is the integer satisfying the expression 8.

The modular multiplication unit 801 and the modular addition/subtraction unit 805 compute $t - u_{pq,1}^2$ mod n, then storing the result into $g_1$. Also, the modular multiplication unit 801 computes $g_1 k(2\text{Inv})$ mod n, then storing the result into $b_1$. Also, the addition/subtraction/multiplication unit 806 computes $u_{pq,1} + b_1$, then storing the result into $u_1$ (1007). These computations can be accomplished as follows: The result to be stored into $g_1$ can be computed such that the modular multiplication unit 801 computes $u_{pq,1}^2$ mod n, and such that the modular addition/subtraction unit 805 subtracts the result from t (i.e., $t - (u_{pq,1}^2)$ mod n). After that, the result to be stored into $b_1$ can be computed such that the modular multiplication unit 801 computes $k(2\text{Inv})$ mod n, and multiplies the result by $g_1$ (i.e., $g_1 k(2\text{Inv})$ mod n). After that, the addition/subtraction/multiplication unit 806 computes $u_{pq,1} + b_1$. Here, 2Inv is an integer satisfying $$2\text{Inv} = 2^{-1} \bmod p. \quad \text{(expression 35)}$$

The modular multiplication unit 801 and the modular addition/subtraction unit 805 compute $(u_q + u_p)$pInv mod q, then storing the result into $h_2$. Also, the addition/subtraction/multiplication unit 806 computes $p - u_p + ph_2$, then storing the result into $u_{pq,2}$ (1008). These computations can be accomplished as follows: The result to be stored into $h_2$ can be computed such that the modular addition/subtraction unit 805 computes $u_q + u_p$ mod q, and such that the modular multiplication unit 801 multiplies the result by pInv (i.e., $(u_q + u_p)$pInv mod q). After that, the addition/subtraction/multiplication unit 806 computes $ph_2$, adds p to the result, and subtracts $u_p$ from the further result (i.e., $p - u_p + (ph_2)$).

The modular multiplication unit 801 and the modular addition/subtraction unit 805 compute $t - u_{pq,2}^2$ mod n, then storing the result into $g_2$. Also, the modular multiplication unit 801 computes $g_2 k(2\text{Inv})$ mod n, then storing the result into $b_2$. Also, the addition/subtraction/multiplication unit 806 computes $u_{pq,2} + b_2$, then storing the result into $u_2$ (1009). These computations can be accomplished as follows: The result to be stored into $g_2$ can be computed such that the modular multiplication unit 801 computes $u_{pq,2}^2$ mod n, and such that the modular addition/subtraction unit 805 subtracts the result from t (i.e., $t - (u_{pq,2}^2)$ mod n). After that, the result to be stored into $b_2$ can be computed such that the modular multiplication unit 801 computes $k(2\text{Inv})$ mod n, and multiplies the result by $g_2$ (i.e., $g_2 k(2\text{Inv})$ mod n). After that, the addition/subtraction/multiplication unit 806 computes $u_{pq,2} + b_2$. Here, 2Inv is the integer satisfying the expression 35.

The addition/subtraction/multiplication unit 806 computes $n - u_1$ and $n - u_2$, then storing the results into $u_3$ and $u_4$ respectively (1010).

The modular multiplication unit 801 computes $u_1 cs$ mod n, $u_2 cs$ mod n, $u_3 cs$ mod n, and $u_4 cs$ mod n, then storing the results into $m_1$, $m_2$, $m_3$, and $m_4$ respectively (1011). These computations can be accomplished such that the modular multiplication unit 801 computes cs mod n, and multiplies the result by $u_1$, $u_2$, $u_3$, and $u_4$ respectively.

The decryption processing unit 132 outputs $m_1$, $m_2$, $m_3$, and $m_4$ as candidates of the plaintext m (1012).

The data $m_1$, $m_2$, $m_3$, and $m_4$, which are outputted by the processing that the decryption processing unit 132 performs, satisfy $$m_1^2 = m_2^2 = m_3^2 = m_4^2 = c \bmod n. \quad \text{(expression 36)}$$

The reason for this is as follows: First, the following expression holds with respect to $u_p$:

$$u_p^2 = (t^{(p-3)/4})^2 = (s^2 c)^{(p-3)/2} = s^{p-3} m^{p-3} \bmod p. \quad \text{(expression 37)}$$

Here, note that, since p is the prime number, $$z^p = z \bmod p \quad \text{(expression 38)}$$

holds for an arbitrary integer z. As a result, $$u_p^2 = s^{-2} m^{-2} \bmod p \quad \text{(expression 39)}$$

holds. Similarly, $$u_q^2 = s^{-2} m^{-2} \bmod q \quad \text{(expression 40)}$$

holds. Using the expression 39 and the expression 40 makes it possible to indicate that $$u_{pq,1}^2 = s^{-2} m^{-2} \bmod p \quad \text{(expression 41)}$$

$$u_{pq,1}^2 = s^{-2} m^{-2} \bmod q \quad \text{(expression 42)}$$

hold. Accordingly, $$u_{pq,1}^2 = s^{-2} m^{-2} \bmod pq \quad \text{(expression 43)}$$

holds. Representing u as $u = (sm)^{-1}$ mod n, $u = u_{pq,1} + b$ leads to $$t = u^2 = u_{pq,1}^2 + 2u_{pq,1} b \bmod n. \quad \text{(expression 44)}$$

This expression results in $$b = (t - u_{pq,1}^2)((2u_{pq,1})^{-1} \bmod p) \bmod n. \quad \text{(expression 45)}$$

Noting that $$k = u_p^1 \bmod p, \quad \text{(expression 46)}$$

$b = b_1$ holds. Consequently, $$m_1 = (sm)^{-1} cs = m \bmod n \quad \text{(expression 47)}$$

holds. It can be shown similarly that this expression holds for $m_2$, $m_3$, and $m_4$ as well.

In the above-described third computation method, no inverse operation is used although the operations such as the modular multiplications are used. Accordingly, the computation method allows implementation of the higher-speed computation as compared with the technique described in the document 3. Also, since e=2 has been set, as compared with the normal computation technique in the HIME(R), an increase in the computation amount proves equivalent to the amount of the 5-time modular multiplications. Here, in general, execution of the 1024-bit general-purpose modular exponentiation operation necessitates substantially 1500-time modular multiplications. Consequently, it can be said that the computation-amount increase in the above-described computation method is comparatively small in comparison with this value.

Also, since no inverse operation is used in the above-described computation method, there exists no necessity for computing the inverse operation and storing the computed value into the memory in advance. This means that the memory-use amount to be needed is a small one.

Also, the above-described computation method is also effective for defense against the side-channel attack. The reason for this is as follows: In the above-described computation method, the step at which the private key is used for the first time is the step 1004. In the operations thereinafter, the operation result at the step 1004 is used. The integer t, i.e., the inputted value at the step 1004, is the multiplication result acquired by multiplying the inputted data c by the four exponentiation of the random number r generated at the step 1001. Accordingly, the attacker finds it impossible to predict the value of the integer t. In general, the Novak's attack is made by taking advantage of the situation where the value to be inputted into the general-purpose modular exponentiation operation has been already known to the attacker. Consequently, the attacker finds it impossible to make the Novak's attack.

As explained above, the above-described computation method exhibits immunity against the side-channel attack, since the method reveals none of the information useful for the side-channel attack. Also, the method allows implementation of the high-speed computation, since the method uses no inverse operation. Moreover, the method guarantees that the memory-use amount to be needed is a small one, since the method accompanies none of the necessity for storing in advance the result of the inverse operation into the memory.

Incidentally, at the step 906, the computations may also be executed in such a manner that $-u_p$ is replaced by $p-u_p$. This replacement allows the computations to be executed without dealing with the negative integer, thereby making it possible to simplify the programs.

So far, the explanation has been given concerning the operation by the data processing unit 132 in the case where the computer B 121 decrypts the encrypted data 141. The explanation, however, is also basically the same in the case where the computer A 101 encrypts the inputted data.

Also, the present invention is usable as a signature generation method. In that case, the ciphertext c is dealt with as signature-target data c. Moreover, when performing the signature generation, $$m = c^d \bmod n \qquad \text{(expression 48)}$$

is computed, then outputting m as the signature for the signature-target data c.

Also, the computers in the above-described embodiments may be smart cards, mobile telephones, or information home electric-appliances. Also, at that time, the modular exponentiation computation may be performed in such a manner that necessary data is inputted on line into the above-described computers.

Also, the data processing units or the CRT computation units in the above-described respective embodiments may be implemented using the specific-purpose hardware. The modular multiplication unit, the modular addition/subtraction unit, the random-number generation unit, the general-purpose modular exponentiation computation unit, the modular-residue computation unit, and the addition/subtraction/multiplication unit may be implemented using the coprocessors or the specific-purpose hardware other than those.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A decryption method of decrypting a plaintext m from a secret exponent d, a public key n, and a ciphertext c in a public-key cryptosystem, said decryption method comprising steps executed by a computer, said steps comprising:
   (i) converting the ciphertext c into a randomized ciphertext t,
   (ii) converting the randomized ciphertext t into a randomized plaintext u, and
   (iii) converting the randomized plaintext u into the plaintext m,
   wherein said step (i) comprises: generating a random number r, and computing the randomized ciphertext t by using the random number r and an integer s derived from the random number r,
   wherein said step (ii) comprises computing the randomized plaintext u by using a value derived from the secret exponent d,
   wherein said step (iii) comprises computing the plaintext m by multiplying the randomized plaintext u by the integer s,
   wherein $r^{e-1}$ is used as the integer s derived from the random number r, where e is a public exponent, and
   wherein said step of converting into the randomized ciphertext t comprises multiplying the ciphertext c by sr.

2. A computer-readable storage medium tangibly embodying a set of processor-executable instructions, wherein execution of the instructions causes a computer to execute the decryption method according to claim 1.

3. A decryption method of decrypting a plaintext m from a secret exponent d, a public key n, and a ciphertext c in a public-key cryptosystem, said decryption method comprising steps executed by a computer, said steps comprising:
   (i) converting the ciphertext c into a randomized ciphertext t,
   (ii) converting the randomized ciphertext t into a randomized plaintext u, and
   (iii) converting the randomized plaintext u into the plaintext m,
   wherein said step (i) comprises: generating a random number r, and computing the randomized ciphertext t by using the random number r and an integer s derived from the random number r,
   wherein said step (ii) comprises computing the randomized plaintext u by using a value derived from the secret exponent d,
   wherein said step (iii) comprises computing the plaintext m by multiplying the randomized plaintext u by the integer s,
   wherein d−1 is used as the value derived from the secret exponent d, and
   wherein said step of converting into the randomized plaintext u comprises computing (d−1) exponentiation of the randomized ciphertext t.

4. A decryption method of decrypting a plaintext m from a secret exponent d, a public key n, and a ciphertext c in a public-key cryptosystem, said decryption method comprising the steps of steps executed by a computer, said steps comprising:

(i) converting the ciphertext c into a randomized ciphertext t,
(ii) converting the randomized ciphertext t into a randomized plaintext u, and
(iii) converting the randomized plaintext u into the plaintext m,
wherein said step (i) comprises: generating a random number r, and computing the randomized ciphertext t by using the random number r and an integer s derived from the random number,
wherein said step (ii) comprises computing the randomized plaintext u by using a value derived from the secret exponent d,
wherein said step (iii) comprises computing the plaintext m by multiplying the randomized plaintext u by the integer s,
wherein the public key n includes prime numbers p and q which satisfy p mod 4=q mod 4=3,
wherein (p−3)/4 and (q−3)/4 being used as the value derived from the secret exponent d in the step of converting into the randomized plaintext u, and
wherein said step of converting into the randomized plaintext u comprises computing (p−3)/4 exponentiation of the randomized ciphertext t, and computing (q−3)/4 exponentiation of the randomized ciphertext t.

5. A signature generation method of generating signature data m from a secret exponent d, a public key n, and data c in a digital signature using a public-key cryptosystem, said method comprising steps executed by a computer, said steps comprising:
(i) converting the data c into randomized data t,
(ii) converting the randomized data t into a randomized signature u, and
(iii) converting the randomized signature u into the signature data m,
wherein said step (i) of converting the data c into the randomized data t comprises: generating a random number r, and using the random number r and an integer s derived from the random number r,
wherein said step (ii) of converting the randomized data t into the randomized signature u comprises: computing the randomized signature u by using a value derived from the secret exponent d,
wherein said step (iii) of converting the randomized signature u into the signature data m comprises multiplying the randomized signature u by the integer s,
wherein $r^{e-1}$ is used as the integer s derived from the random number r, where e is a public exponent, and
wherein said step of converting into the randomized data t comprises multiplying the data c by sr.

6. A computer-readable storage medium tangibly embodying a set of processor-executable instructions, wherein execution of the instructions causes a computer to execute the signature generation method according to claim 5.

7. A decryption device for decrypting a plaintext m from a secret exponent d, a public key n, and a ciphertext c in a public-key cryptosystem, comprising:
a processing unit for converting the ciphertext c into a randomized ciphertext t,
a processing unit for converting the randomized ciphertext t into a randomized plaintext u, and
a processing unit for converting the randomized plaintext u into the plaintext m,
wherein said processing unit for converting the ciphertext c into the randomized ciphertext t comprises: a processing unit for generating a random number r, and
a processing unit for using the random number r and an integer s derived from the random number r,
wherein said processing unit for converting the randomized ciphertext t into the randomized plaintext u uses a value derived from the secret exponent d,
wherein said processing unit for converting the randomized plaintext u into the plaintext m multiplies the randomized plaintext u by the integer s, wherein $r^{e-1}$ is used as the integer s derived from the random number r, where e is a public exponent, and
wherein said processing unit for converting into the randomized ciphertext t comprises multiplying the ciphertext c by sr.

8. A signature generation device for generating signature data m from a secret exponent d, a public key n, and data c in a digital signature using a public-key crypto system, comprising:
a processing unit for converting the data c into randomized data t,
a processing unit for converting the randomized data t into a randomized signature u, and
a processing unit for converting the randomized signature u into the signature data m,
wherein said processing unit for converting the data c into the randomized data t comprises: a processing unit for generating a random number r, and a processing unit for using the random number r and an integer s derived from the random number r,
wherein said processing unit for converting the randomized data t into the randomized signature u uses a value derived from the secret exponent d,
wherein said processing unit for converting the randomized signature u into the signature data m multiplies the randomized signature u by the integer s,
wherein $r^{e-1}$ is used as the integer s derived from the random number r, where e is a public exponent, and
wherein said processing unit for converting into the randomized ciphertext data t comprises multiplying the ciphertext data c by sr.

* * * * *